US009514600B2

(12) United States Patent
Watkins et al.

(10) Patent No.: US 9,514,600 B2
(45) Date of Patent: Dec. 6, 2016

(54) SLOT MACHINE GAMES WITH GROUPS OF SYMBOLS ROTATED TOGETHER

(71) Applicant: EVERI GAMES INC., Austin, TX (US)

(72) Inventors: Brian Alexander Watkins, Austin, TX (US); Michael Conway, Austin, TX (US)

(73) Assignee: Everi Games Inc., Austin, TX (US)

( * ) Notice: Subject to any disclaimer, the term of this patent is extended or adjusted under 35 U.S.C. 154(b) by 192 days.

(21) Appl. No.: 14/317,154

(22) Filed: Jun. 27, 2014

(65) Prior Publication Data

US 2015/0379806 A1 Dec. 31, 2015

(51) Int. Cl.

*G06F 17/00* (2006.01)
*G07F 17/32* (2006.01)
*G07F 17/34* (2006.01)

(52) U.S. Cl.

CPC .......... *G07F 17/3213* (2013.01); *G07F 17/34* (2013.01)

(58) Field of Classification Search

None

See application file for complete search history.

(56) References Cited

U.S. PATENT DOCUMENTS 8,628,399 B2 * 1/2014 Aoki ................................ 463/15
2009/0137309 A1 * 5/2009 Thomas .............. G07F 17/3211 463/20
2013/0217469 A1 * 8/2013 Fujisawa ............. G07F 17/3267 463/20
2013/0217484 A1 * 8/2013 Fujisawa ............. G07F 17/3272 463/29
2014/0004924 A1 * 1/2014 Lerias, III ............. G07F 17/326 463/20
2014/0011583 A1 * 1/2014 Tanzawa ................. A63F 13/08 463/31
2014/0274288 A1 * 9/2014 Hornik .................. G07F 17/326 463/20

* cited by examiner

*Primary Examiner* — Paul A D'Agostino

(74) *Attorney, Agent, or Firm* — Nathan Calvert, Esq.; J P Cody, Esq.; Russell Culbertson, Esq.

(57) ABSTRACT

A slot machine game provides a bonus feature wherein, after the base-game reels have stopped to populate the symbol array, a rectangular region or group of symbols within in the symbol array is selected, and this region is rotated to produce a modified symbol array which is then evaluated for wins. This is preferably done after spins that do not win a prize, in order to improve the payout and excitement of the game. The group rotation can be made available in base or bonus games, and can be used with game logic that searches for a suitable group to rotate by evaluating the prize that will result and choosing a group above a designated threshold.

18 Claims, 9 Drawing Sheets

SLOT MACHINE GAMES WITH GROUPS OF SYMBOLS ROTATED TOGETHER

TECHNICAL FIELD OF THE INVENTION

The invention relates to methods for conducting a reel or symbol array type wagering game including a feature that selects and rotates groups of symbols to improve a spin result.

BACKGROUND OF THE INVENTION

Various slot machine games use features that enhance certain game symbols to improve the game experience for games with reels, simulated reels, or other arrays of gaming symbols. For example, many slot machines have features that turn certain symbols wild in certain situations in order to achieve more winning patterns along defined paylines. Other games provide various enhancements to the symbols in a spin result that provide for higher prizes when the result is evaluated.

What is needed are more exciting variations for the creation and use of symbol enhancements in order to increase player excitement and enjoyment of slot machine games.

SUMMARY OF THE INVENTION

The present invention includes a highly entertaining method of conducting a slot machine game for one or more players. The entertainment value is achieved with gaming method including a bonus feature wherein, after the base-game reels or symbol updates have stopped to populate the symbol array, a rectangular region or group of symbols within in the symbol array is selected, and this region is rotated to produce a modified symbol array which is then evaluated for wins. This is preferably done after spins that do not win a prize, in order to improve the payout and excitement of the game. The group rotation can be made available in base or bonus games, and can be used with game logic that searches for a suitable group to rotate by evaluating the prize that will result and choosing a group above a designated threshold.

The search algorithm used may vary in the context of a free spin bonus round, to lower the resulting prize threshold and provide for more frequent awards in the free spin bonus round. Example algorithms are disclosed to implement such thresholds.

Another version of the invention is a computer program stored on a non-transitory readable medium. The software version is, of course, typically designed to be executed by a gaming machine or networked gaming system. The software includes multiple portions of computer executable code referred to as program code. Gaming results are provided in response to a wager and displayed by display program code that generates simulated slot reels each including one or more symbol locations. The program also has game controller program code for determining game play results involving spins or other randomization of an array of symbols, each spin producing a spin result, each spin result having a chance to include one or more of the group rotations.

Another version of the invention is a gaming system that includes one or more gaming servers, and a group of electronic gaming machines connected to the servers by a network. The various functionality described herein may be distributed between the electronic gaming machines and the gaming servers in any practically functional way. For example, a Class III architecture may be used in which random number generation and game logic are primarily executed by processors in the electronic gaming machine. Another example architecture is for the servers to determine all aspects of game logic, random number generation, and prize awards. The gaming machines provide functionality of interfacing with the player and animating the game results received from the server in an entertaining manner. However, other embodiments might use a thin client architecture in which the animation is also conducted by the server, and electronic gaming machines serve merely as a terminal to receive button or touch screen input from the player and to display graphics received from the server.

Different features may be included in different versions of the invention. For example, different animation themes may be applied that display the application of the group rotations in different ways.

These and other advantages and features of the invention will be apparent from the following description of the preferred embodiments, considered along with the accompanying drawings.

DETAILED DESCRIPTION OF PREFERRED EMBODIMENTS

Figure 1A:
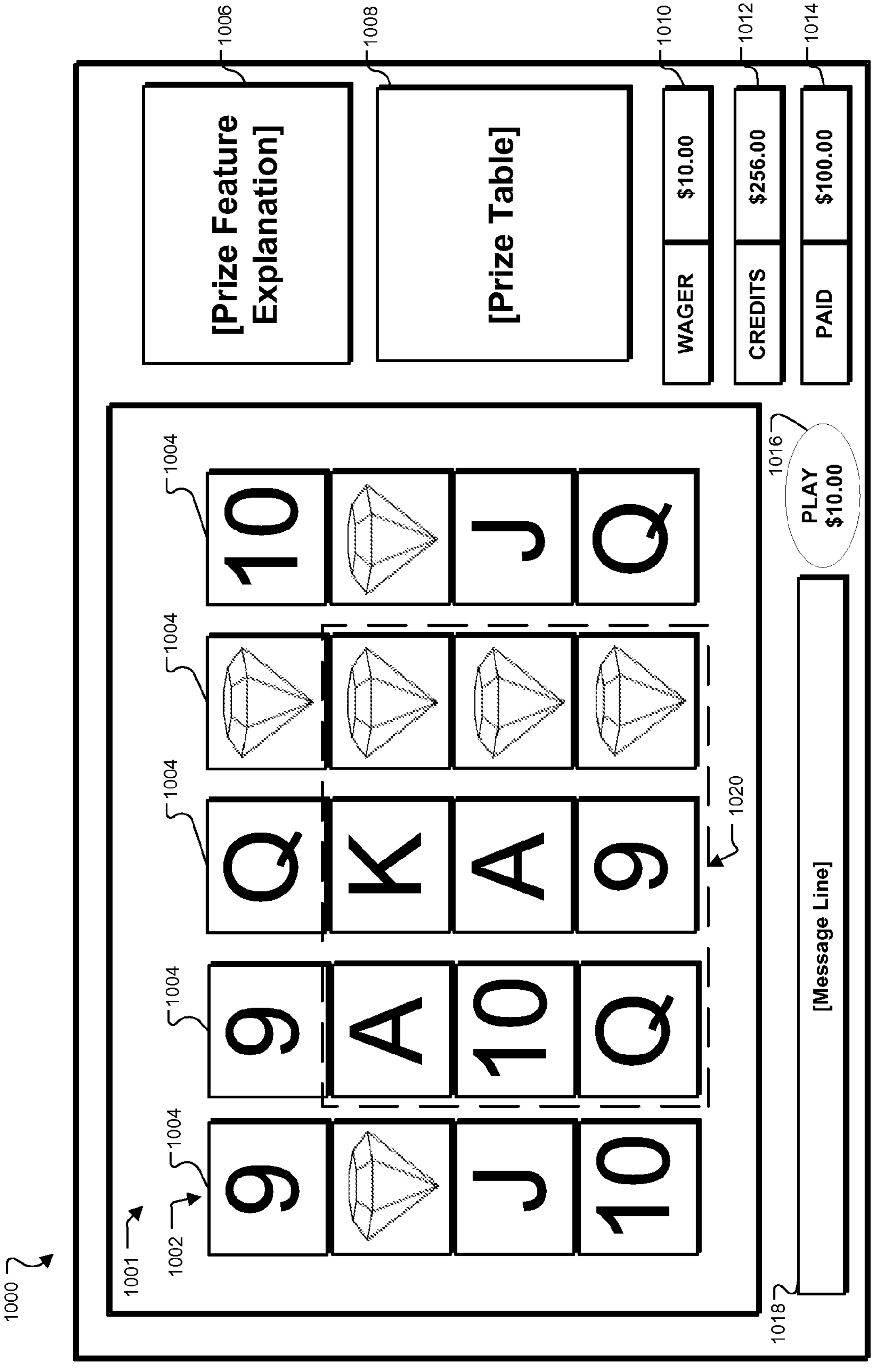
FIGS. 1A-1C are a sequence of game screen diagrams showing a group rotation feature according to one embodiment.
Figure 1B:
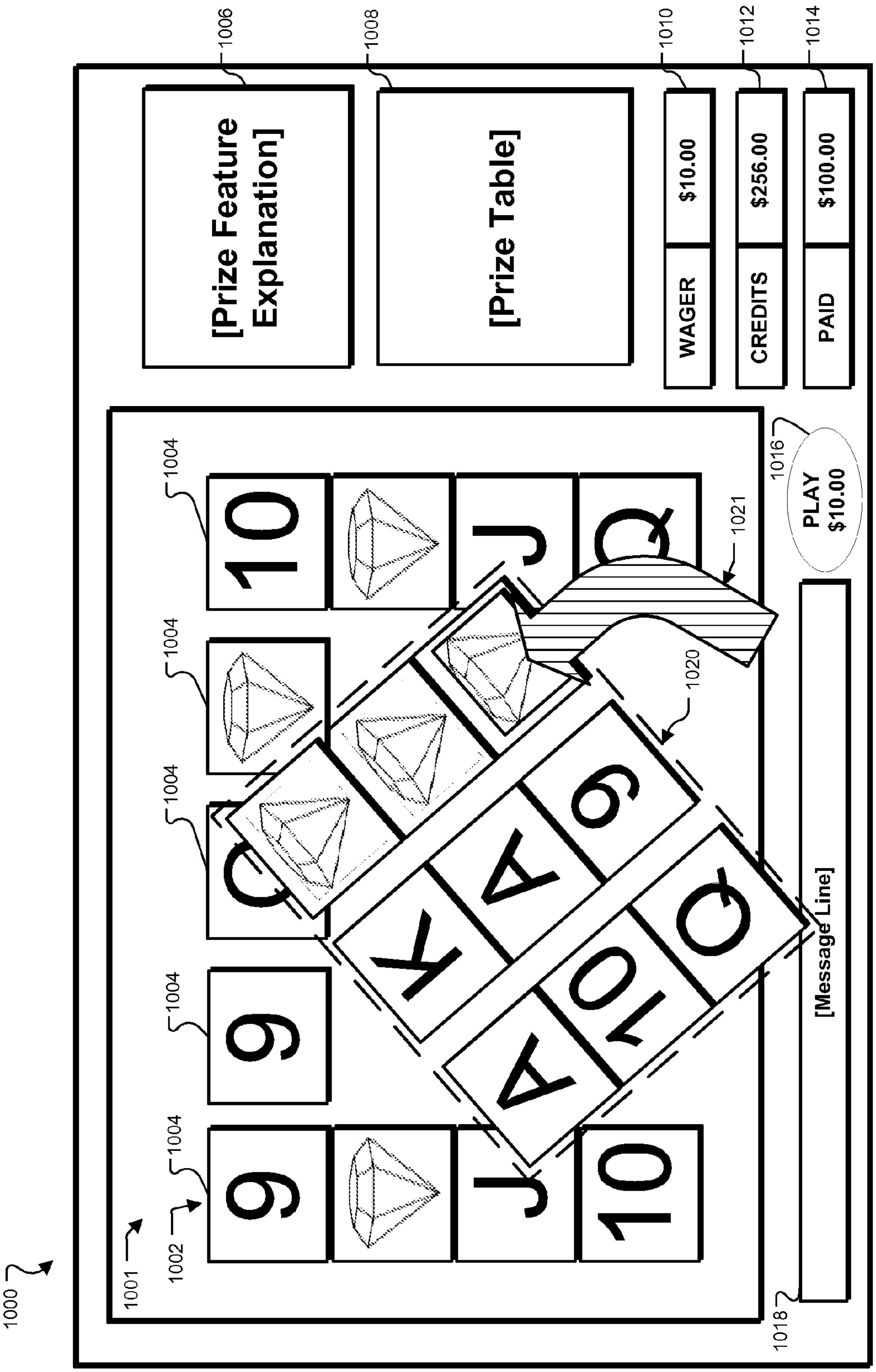
Figure 1C:
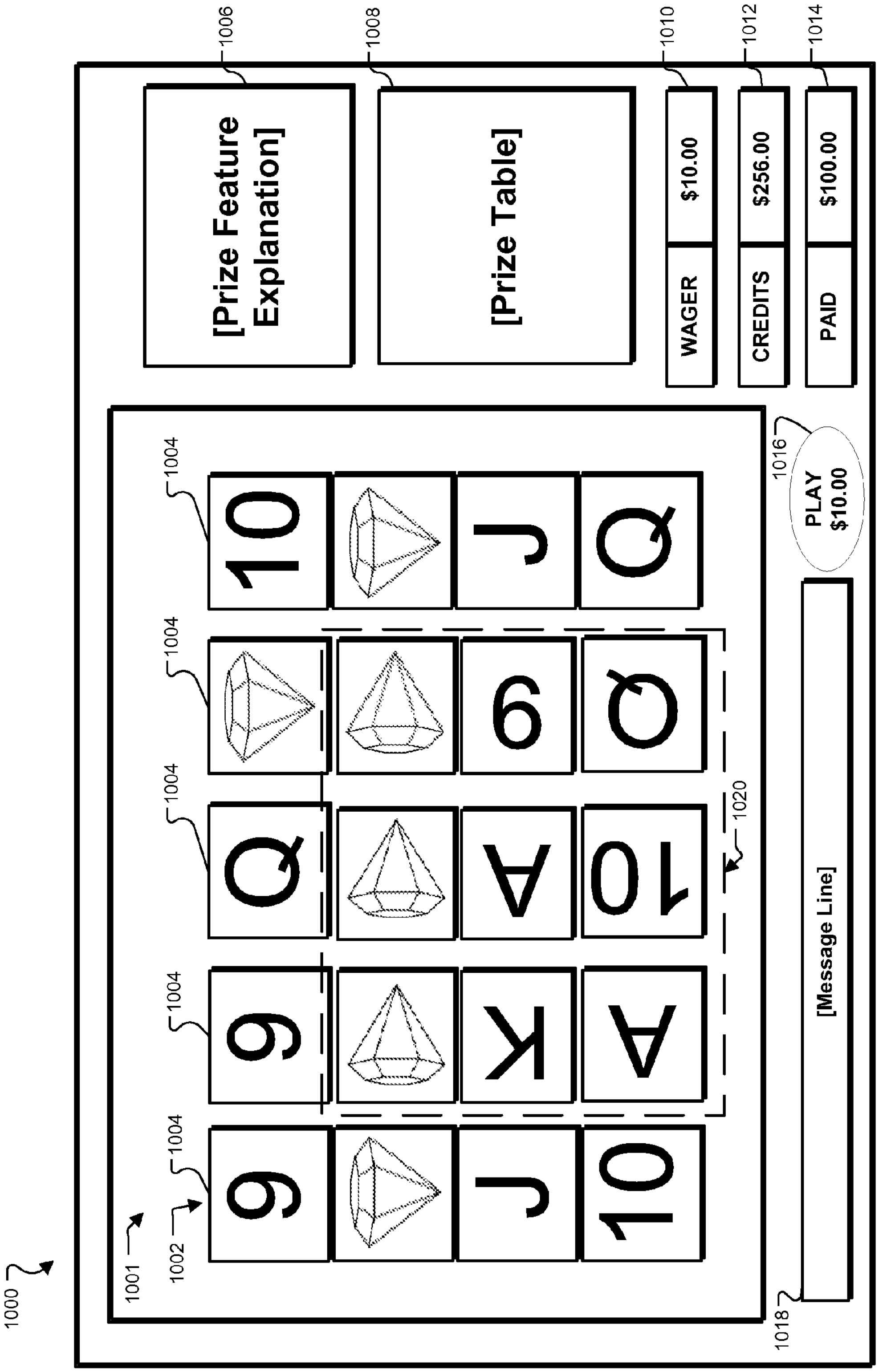
Figure 4A:
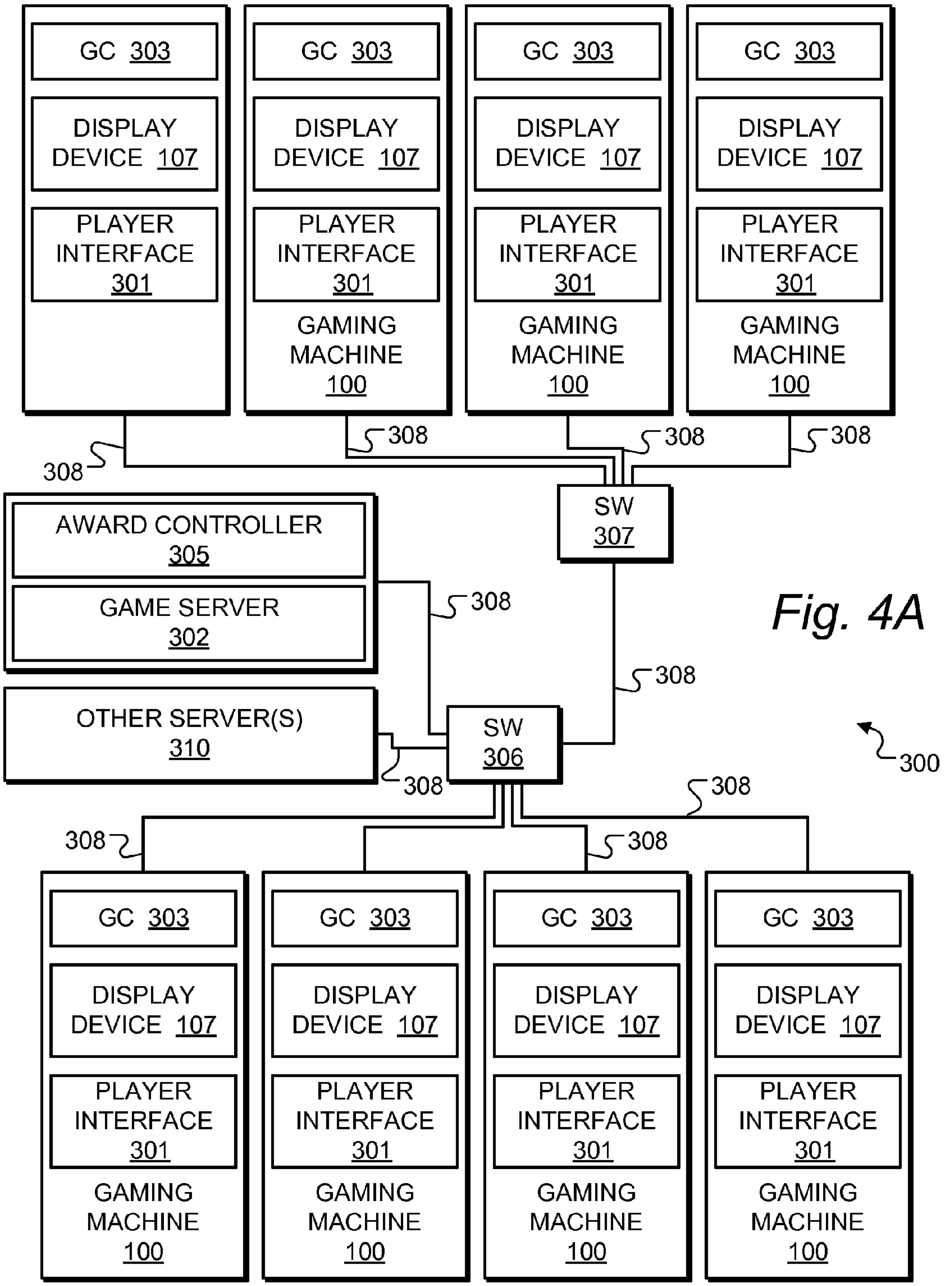
FIG. 4A is a system block diagram of a gaming system according to one embodiment of the present invention.

FIGS. 1A-1C are a sequence of game screen diagrams showing a group rotation, which would be shown on the electronic displays at various gaming machines 100 shown in FIG. 4A. In this embodiment, the graphic display includes a matrix of symbol locations 1001 ("matrix", "array") that displays symbols in four symbol locations 1004 on each of five separate columns 1002 or simulated reels. The array 1001 may function as a number of simulated multisymbol reels, simulated unisymbol reels, or individual randomized locations that are updated according to a suitable randomized scheme to achieve the desired variability. Preferably, all the symbols locations 1004 in the array 1001 are updated in response to player wager and game activation input to display a new set of symbols in the array.

In this embodiment of the invention, a slot machine matrix game employs a group rotation feature, in which selected groups of symbols that meet a defined criteria, such as the depicted group 1020, are rotated after the array is updated to move the symbols to a new position to be evaluated as further described below. Preferably the group rotations are employed in base game play and any bonus rounds, but this is not limiting and the feature may be used in any suitable game. Depicted in the base game result shown in matrix 1001 is an example group rotation 1020, which is shown highlighted by the dotted box but in the electronic display will be highlighted in a suitable animated fashion. The activation and function of the group rotation feature is further described below, but generally it proceeds according the example sequence of FIGS. 1A-C showing the group being defined and highlighted in FIG. 1A, the animated rotation of the entire group about its center in as depicted by the motion arrow 1021 of FIG. 1B, and the stopped position of the group 1020 rotated 90 degrees to counterclockwise in this example. While FIG. 1C shows the symbols appearing oriented sideways after the rotation is stopped, some versions may animate the symbols themselves reorienting within their symbol position to be displayed upright, either during or after the group rotation.

The graphic display 1000 also includes a box 1006 for displaying texts regarding prize features. There may also be displayed a prize table 1008. A group of accounting indicators at the lower right displays various pieces of data such as the current wager box 1010, available credits 1012, and/or payouts 1014. The touch screen play button 1016 also displays the wager for each game 1016. A message line 1018 displays messages concerning game progress, results, and related information.

While a 4×5 two-dimensional symbol array is shown, the techniques herein may be employed with any suitable slot machine games that use randomized groups of symbols as the basis of the games. In one alternative version, for example, the matrix of symbol locations includes X (horizontal), Y (vertical), and Z (depth) dimensions with at least two symbol locations deep in the Z dimension. 3D graphics are employed to display the depth of the matrix. This alternative embodiment allows the groups may be rotated in the in the Z dimension.

Figure 2A:
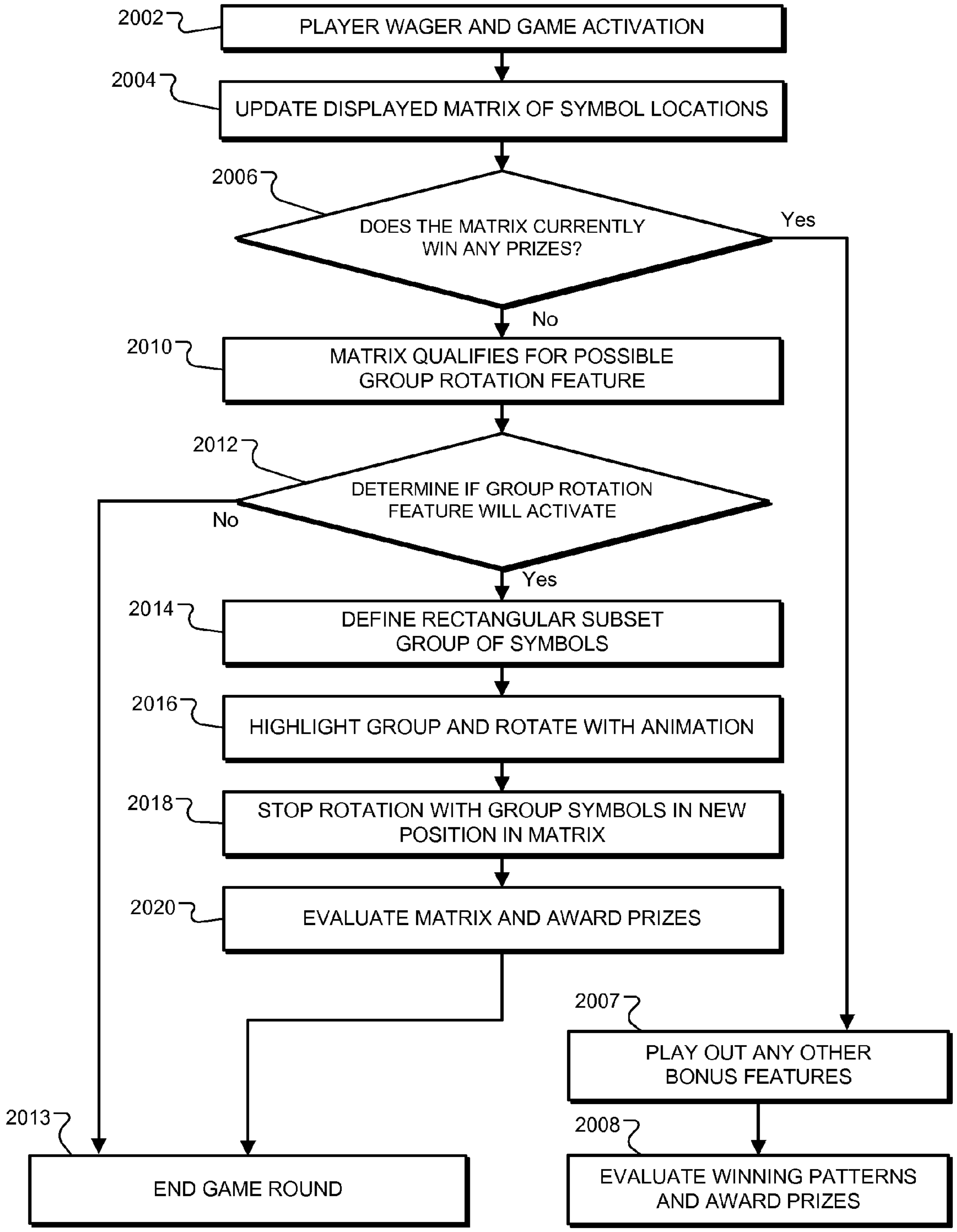
FIG. 2A is a flow chart showing the general method of play for an example embodiment including group rotations according to one embodiment the invention.

FIG. 2A is a flow chart showing the general method of play for an example embodiment including group rotations. The depicted method preferably takes place in the context of the base game, but may also be employed in the context of a bonus game round. In fact, one preferred embodiment includes a bonus round of multiple free spins. In such a case, the wager and game activation portion of step 2002 is obviously skipped for the free spins, and a base game round with a free spin award will precede the bonus round.

Referring to FIG. 2A, the depicted method begins with displaying an initial state of the array which typically includes some arrangement of symbols in the symbol locations of the array. To begin a game play, the method receives a wager from the game player at step 2002, which typically consists of some input from the player to set the amount to be wagered from their credit amount on the machine. This step may also be carried over from previous game rounds by simply starting the game with the previous wager amount set. Then, the method receives a play input from the player. This typically happens through a 'Play' button on the game cabinet or touchscreen display, and serves to place the wager and start a single round of game play in the base game. The method also begins conducting the activated game by showing the matrix of symbols being scrambled. In embodiments having reels, reels displays, or simulated reels, this is conducted by spinning the reels.

In this embodiment, the group rotation feature triggers as mystery only after a losing reel spin, as shown by step 2006 in which the process checks whether the updated matrix or "spin" currently wins any prizes. If so, the game round is played out according to the other games rules and bonus features at step 2007, with the array evaluated and any prizes won awarded at step 2008. If the spin does not win a prize at step 2006, the spin qualifies to possibly activate a group rotation feature as shown at step 2010. A rectangular group of symbols in the reel window is defined at step 2014, and shown to be highlighted and rotated at step 1018, to form a modified matrix of symbols. If the selected region is square, it can rotate 90 degrees clockwise, or 90 degrees counterclockwise, or 180 degrees rotating either way. If it is non-square, oblong, it always rotates 180 degrees. Preferably, the process only performs a rotation if the resulting symbol matrix will form a win over some threshold. This involves searching for an appropriate group to rotate as further described below. After the rotation stops, the matrix is evaluated according to the game rules such as by evaluating paylines or paygroups, and resulting prizes awarded at step 2013.

Figure 2B:
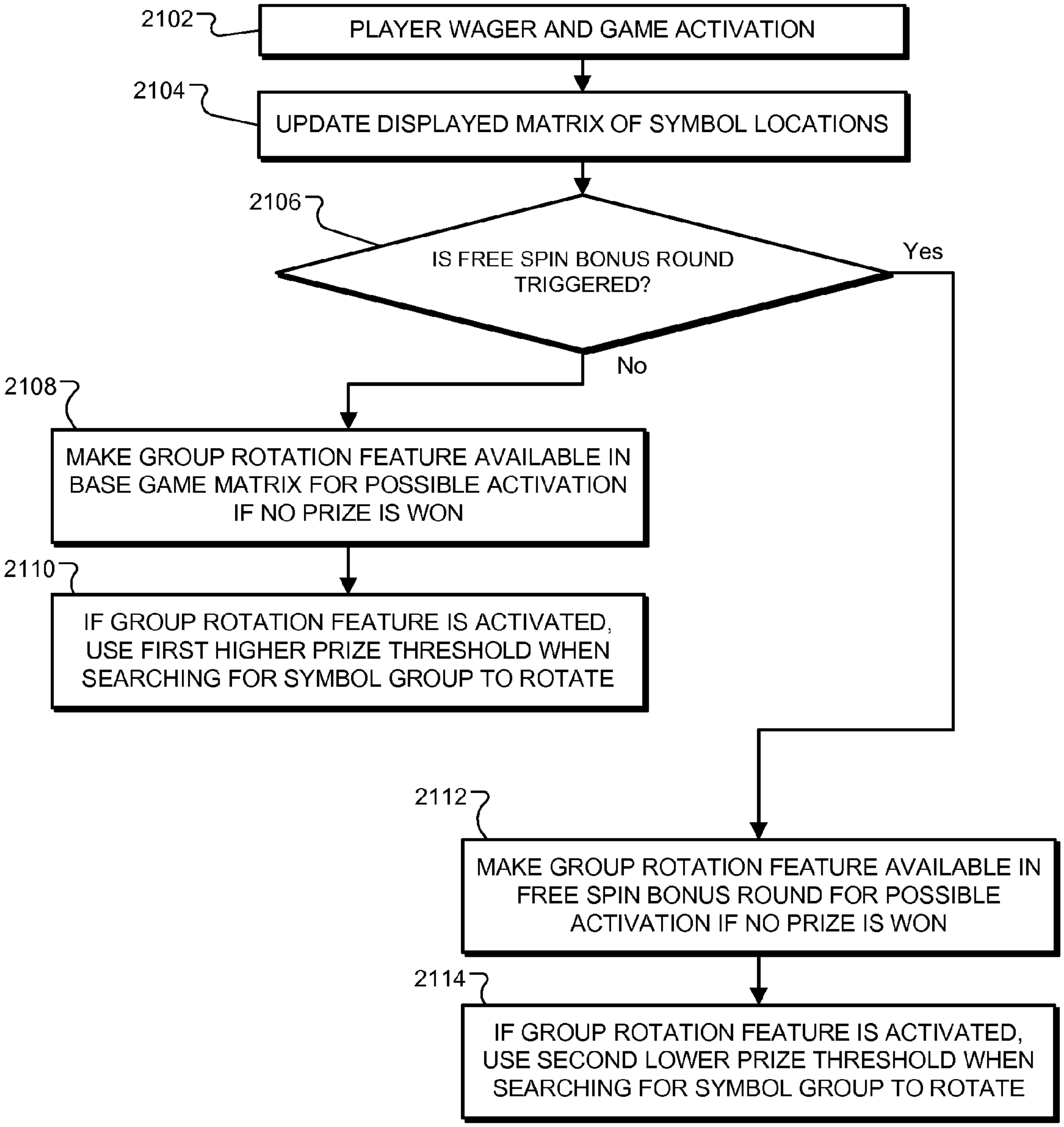
FIG. 2B is a flow chart showing a game method using a group rotations feature according to another embodiment.

FIG. 2B shows a flowchart for a process using the symbol group rotation feature in a free spin bonus round. A preferred version, a Multimedia Games® slot machine game titled "Sparkle and Shine," includes a free spin bonus round triggered by three or more scatter bonus symbols. If a base-game spin triggers the bonus, then the symbol group rotation feature event, called "Twist & Win," is not triggered on that same stop, as shown by the process decision branch at step 2106. If no free spin bonus is triggered, the process goes to step 2108 where it is allowed to use the symbol group rotation feature according to the process discussed with respect to FIG. 1A. Preferably, if the symbol group rotation feature is activated, as shown as step 2110, the process searches for a group to rotate that will win a prize above a first prize threshold amount. The particular search algorithm is not limiting, and it may start with finding paylines that are close to containing a winning pattern, and search for symbols that could be rotated into place to complete the pattern if a symbol group of a designated size were selected and rotated. Another example search algorithm may consider multiple candidate groups selected randomly or strategically, and evaluate the candidate prizes they would win if rotated, then select a suitable group with a desired prize from the evaluated candidates. Other suitable algorithms may also be designed and used to find a suitable symbol group that will provide a prize above the designated first threshold at step 2110.

Referring again to step 2106, if the free spin bonus round is triggered, the process goes to step 2112, where it conducts multiple free spins and makes the symbol group rotation feature available for the spins. The group rotation feature is conducted according to the process in FIG. 1A, but with free spins instead of the wager and activation of the base game round. At step 2114, the process uses a second, lower prize threshold amount to search for symbol groups to rotate. The search is conducted as discussed above. The lower prize amount results in more frequent rotations and prizes, making the free spin bonus round more exciting to the player. In a preferred version, the threshold and search algorithm are determined such that all or almost all of the free spins that do not win a prize on the free spin will subsequently win a prize from a group rotation.

It is noted that while this embodiment provides the group rotation feature as a mystery event only allowed when a spin does not win a prize, other versions may trigger the feature even after a spin wins a prize, in the base game or the bonus game. The trigger mechanism in such case may be mystery trigger, or a special symbol, pattern, or scatter pattern. The prize threshold used to search for a group to rotate will be adjusted accordingly to achieve a desired payout according to the game math, usually by adjusting the threshold downward to provide for lower prizes. The search algorithm in this case, or the preferred embodiment, may also include a target prize amount or an upper prize threshold to achieve a desired payout percentage for the game title's long term performance.

While the group rotation feature is described in this embodiment as being activated as a mystery feature, and particularly only after a losing reel spin, this is not limiting and any suitable activation method may be used to trigger the feature. For example, it could be triggered by the appearance of a special symbol or symbol combination in the reel stop. Further, while a losing reel spin is specified as a game history precondition, other versions may use no precondition, or use any other suitable precondition.

Preferably, the symbol groups that are rotated according to the techniques herein are of 2×2 size or larger for a two-dimensional symbol array. The rotated group can be any suitable size less than the entire array.

Further, the rotated groups of symbols are described as being a rectangular subset of the array of locations, but this is not limiting and other versions may employ other shapes for the rotated group, given that the shape is suitable for rotation such that it fills the groups original locations when stopped. Further, while contiguous groups of symbols are described as being rotated, any suitable group may be selected, such as only corners or edges of a rectangle, only two opposing edges, or any other group of symbols that may be rotated to achieve the payline or paygroup adjustment feature described herein. A paygroup is referred to as a group of symbols of a designated type that are contiguous horizontally or vertically, such as a group of matching symbols. Such paygroups are employed in certain Multimedia Games slot machine games instead of paylines, with the prize awarded for achieving a contiguous matched group being based on the size of the group. The game logic and search techniques applied herein may be employed to achieve the same effect with paygroups as they do with paylines. That is, to located a group of symbols for rotation that would create a paygroup with a minimum or designated prize amount due according to the game rules.

Figure 4B:
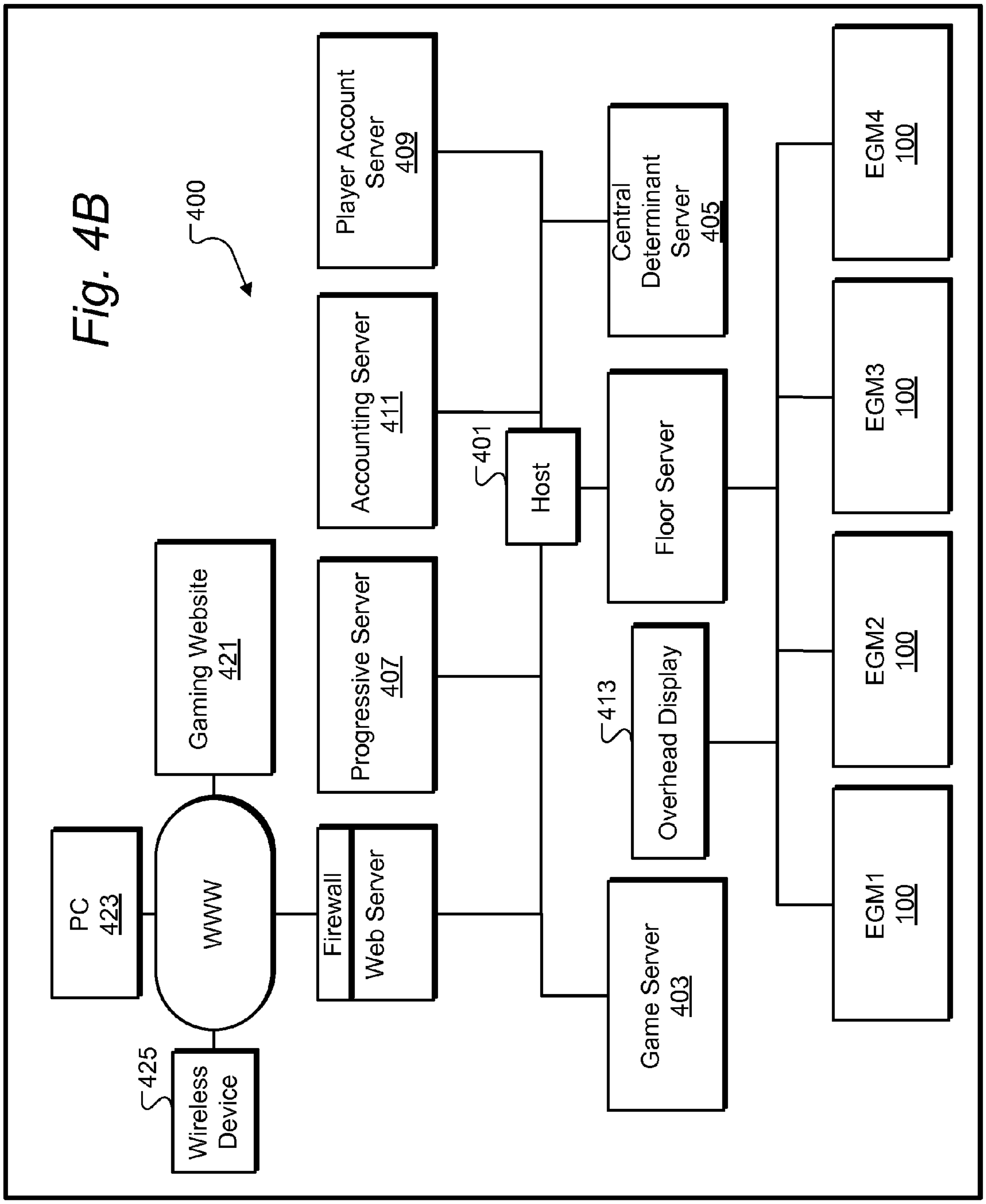
FIG. 4B is a system block diagram of a gaming system according to another embodiment.

In the preferred version, the above described game is provided on a gaming network such as that of FIG. 4B. Preferably a Class III architecture is employed with random number generation and game functionality implemented on the EGM. It should be understood that this is only one example embodiment, and other versions may divide the processing tasks of the game method in a different manner. For example, some systems may employ a thin client architecture in which practically all of the processing tasks are performed at the game server, and only display information for the player interface transmitted to the electronic gaming machine. In such an embodiment, only the steps involving player input or display are performed by the electronic gaming machine, with the remaining steps performed by one of the game servers in the system. In such a case, though, the software architecture is preferably designed as a thin client in which a dedicated virtual machine running on the game server (or a virtual machine server connected in the gaming network) performs the tasks designated in the present drawing as occurring "at the gaming machine." In the depicted method, the method is performed by the respective computer hardware operating under control of computer program code. While central processor arrangements may vary (for example award controllers may be integrated on the same machine with a gaming server, or may be a separate server connected on a secure network), the particular central determinant architecture is not limiting and will be referred to generally in this drawing as the game server (i.e. 302, 403). As shown at step 2002 in FIG. 2A, the method performed at the game server further includes receiving game play requests originating from electronic gaming machine 100, and sending commands to the gaming machine to show reels spinning, group rotations appearing, and results being displayed. The division of game logic steps between gaming machines and servers is known in the art and may be accomplished according to suitable methods allowed for the relevant gaming jurisdictions.

Figure 3A:
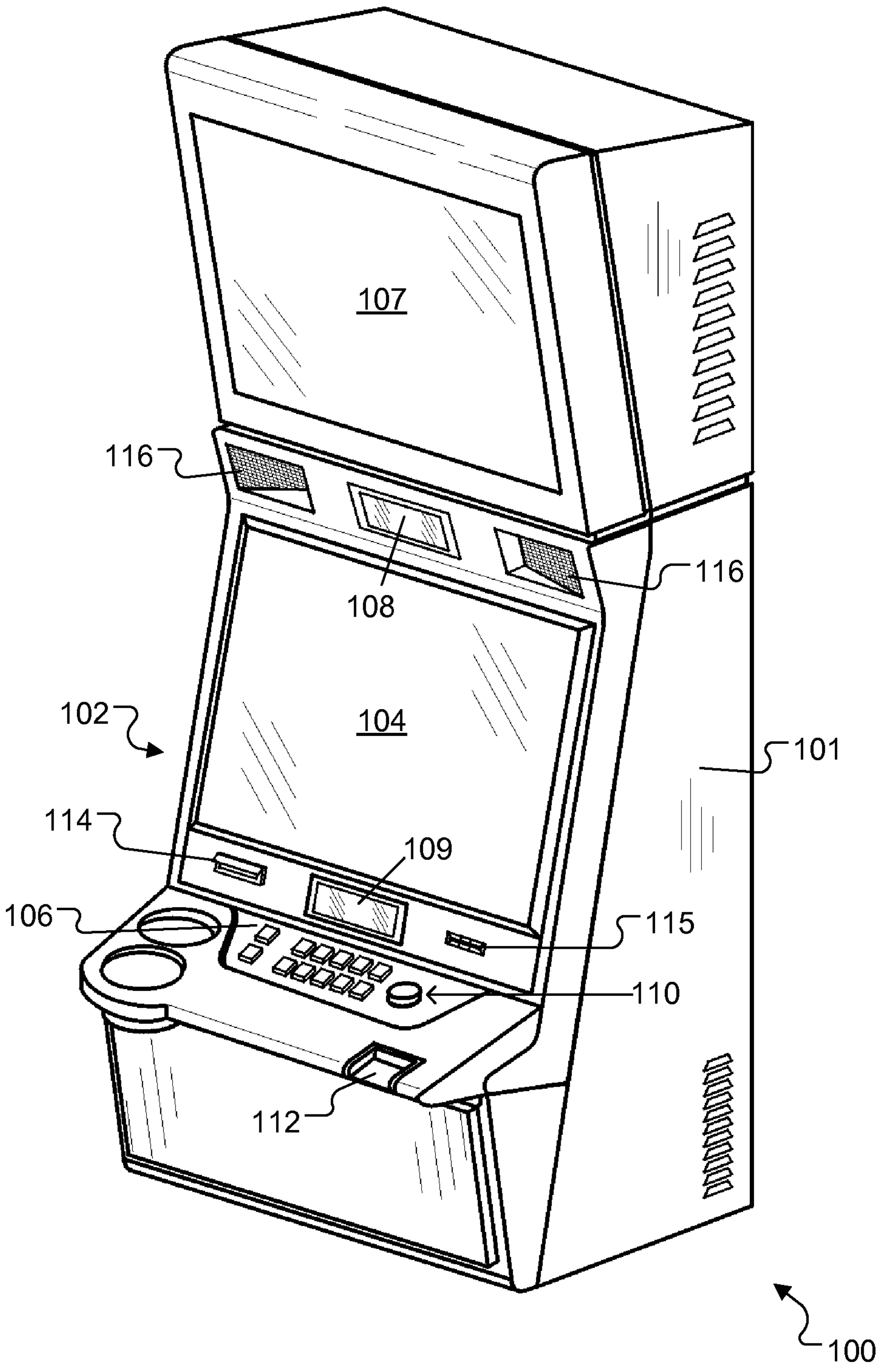
FIG. 3A is a front perspective view of a gaming machine which may be used in a gaming system embodying the principles of the present invention.
Figure 3B:
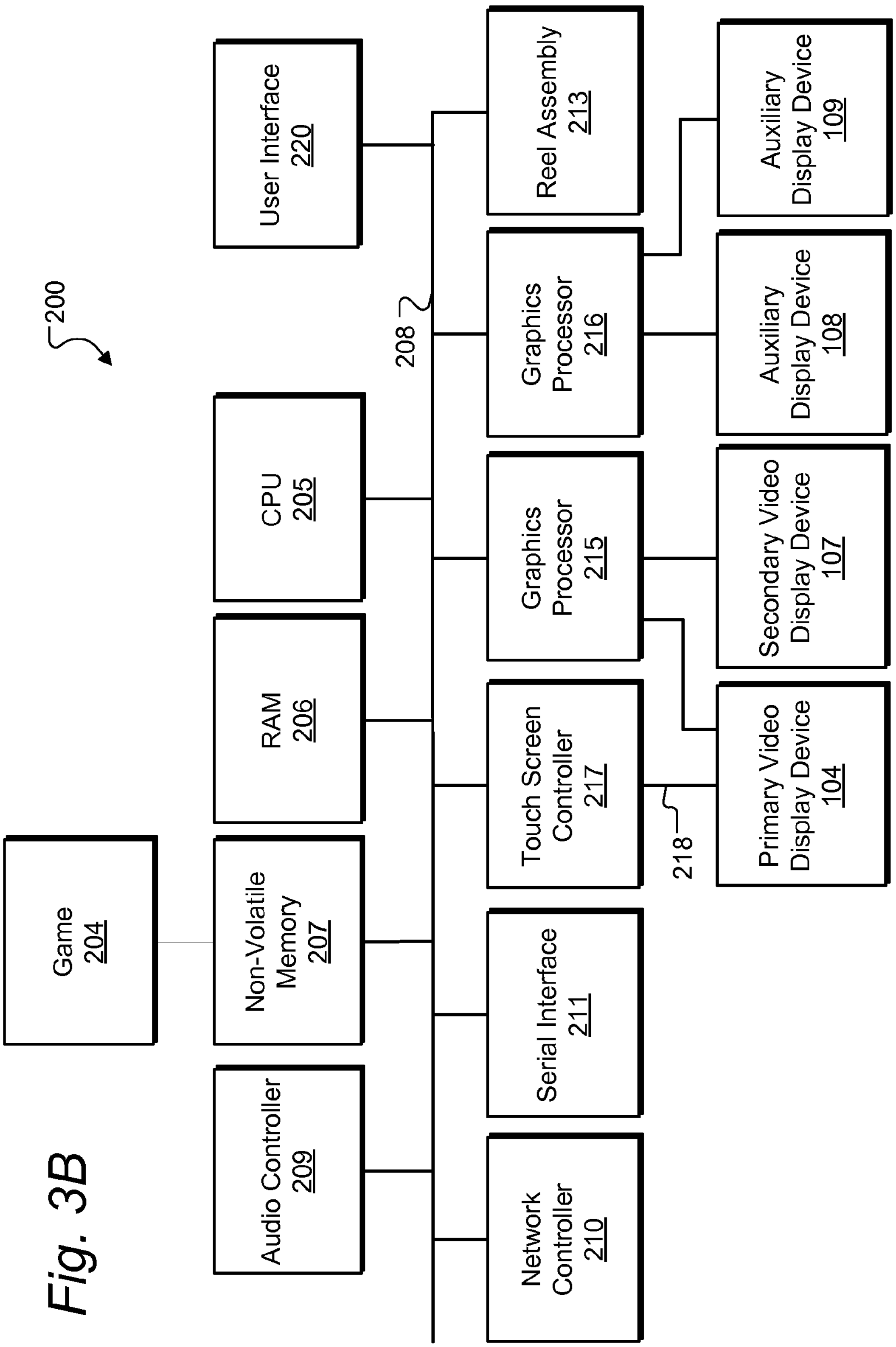
FIG. 3B is a block diagram showing various electronic components of the gaming machine shown in FIG. 3A together with additional gaming system components.

FIG. 3A shows a gaming machine 100 that may be used to implement a group rotation feature according to the present invention. The block diagram of FIG. 3B shows further details of gaming machine 100. Referring to FIG. 3A, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 3A also includes a number of mechanical control buttons 110 mounted on ledge 106. These control buttons 110 may allow a player to select a bet level, select pay lines, select a type of game or game feature, and actually start a play in a primary game. Other forms of gaming machines according to the invention may include switches, joysticks, or other mechanical input devices, and/or virtual buttons and other controls implemented on a suitable touch screen video display. For example, primary video display device 104 in gaming machine 100 provides a convenient display device for implementing touch screen controls.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 3B shows a logical and hardware block diagram 200 of gaming machine 100 which includes a central processing unit (CPU) 205 along with random access memory 206 and nonvolatile memory or storage device 207. All of these devices are connected on a system bus 208 with an audio controller 209, a network controller 210, and a serial interface 211. A graphics processor 215 is also connected on bus 208 and is connected to drive primary video display device 104 and secondary video display device 107 (both mounted on cabinet 101 as shown in FIG. 3A). A second graphics processor 216 is also connected on bus 208 in this example to drive the auxiliary display devices 108 and 109 also shown in FIG. 3A. As shown in FIG. 3B, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself typically comprises a thin film that is secured over the display surface of primary video display device 104. The touch screen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 3B are elements commonly associated with a personal computer. These elements are preferably mounted on a standard personal computer chassis and housed in a standard personal computer housing which is itself mounted in cabinet 101 shown in FIG. 3A. Alternatively, the various electronic components may be mounted on one or more circuit boards housed within cabinet 101 without a separate enclosure such as those found in personal computers. Those familiar with data processing systems and the various data processing elements shown in FIG. 3B will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 3B as being connected directly on system bus 208 may in fact communicate with the other system components through a suitable expansion bus. Audio controller 209, for example, may be connected to the system via a PCI bus. System bus 208 is shown in FIG. 3B merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104, secondary video display device 107, and graphics processor 216 is shown for controlling both auxiliary display devices 108 and 109, it will be appreciated that CPU 205 may control all of the display devices directly without any intermediate graphics processor. The invention is not limited to any particular arrangement of processing devices for controlling the video display devices included with gaming machine 100. Also, a gaming machine implementing the present invention is not limited to any particular number of video display device or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine and may also implement a game client for directing one or more display devices at the gaming machine to display portions of a group rotation feature according to the present invention. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 100 is included. In particular, network controller 210 provides an interface to a game controller which controls certain aspects of the group rotation feature as will be discussed below in connection with FIGS. 3A-B.

It should be noted that the invention is not limited to gaming machines employing the personal computer-type arrangement of processing devices and interfaces shown in example gaming machine 100. Other gaming machines through which a group rotation feature is implemented may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. It is possible to implement a group rotation feature within the scope of the present invention using an electro mechanical arrangement or even a purely mechanical arrangement for displaying the symbols needed to complete the group rotation feature as described herein. However, the most preferred forms of the invention utilize one or more video display devices for displaying the spinning reels, the accumulated symbols, and the group rotations feature. For example, a gaming machine suitable for providing a group rotation feature may include a mechanical reel-type display rather than a video-type display device for displaying results in a primary game, and include a video display device for presenting the group rotation feature as a bonus game.

Still referring to the hardware and logical block diagram 200 showing an example design for a gaming machine 100, the depicted machine in operation is controlled generally by CPU 205 which stores operating programs and data in memory 207 with wagering game 204, user interface 220, network controller 210, audio/visual controllers, and reel assembly 213 (if mechanical reel configuration). CPU or game processor 205 may comprise a conventional microprocessor, such as an Intel® Pentium® microprocessor, mounted on a printed circuit board with supporting ports, drivers, memory, software, and firmware to communicate with and control gaming machine operations, such as through the execution of coding stored in memory 207 including one or more wagering games 204. Game processor 205 connects to user interface 220 such that a player may enter input information and game processor 205 may respond according to its programming, such as to apply a wager and initiate execution of a game.

Game processor 205 also may connect through network controller 210 to a gaming network, such as example casino server network 400 shown in FIG. 4B. Referring now to FIG. 4B, the casino server network 400 may be implemented over one or more site locations and include host server 401, remote game play server 403 (which may be configured to provide game processor functionality including determining game outcomes and providing audio/visual instructions to a remote gaming device), central determination server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards.

Referring now to FIG. 4A, a gaming system 300 according to another embodiment of the present invention is shown again in a network and system diagram format. System 300 includes a number of gaming machines, each comprising a gaming machine 100 in this example implementation. For purposes of describing system 300, each gaming machine 100 in FIG. 4A is shown as including a video display device 107 and a player interface that may include buttons, switches, or other physical controls and/or touch screen controls as discussed above in connection with FIG. 4A. This player interface is labeled 301 in FIG. 4A. System 300 further includes a game server 302 and a respective game client 303 (abbreviated "GC" in FIG. 4A) included with each respective gaming machine 100. In the form of the invention shown in FIG. 4A these two components, game server 302 and the game client components 303 combine to implement a game control arrangement which will be described in detail below. System 300 also includes an award controller 305, which is shown in FIG. 4A as being associated with game server 302 to indicate that the two components may be implemented through a common data processing device/computer system. Gaming machines 100, game server 302, and award controller 305 are connected in a network communication arrangement including first and second network switches 306 and 307, connected together through various wired or wireless signal paths, all shown as communications links 308 in FIG. 4A.

Each gaming machine 100, and particularly player interface 301 associated with each gaming machine, allows a player to make any inputs that may be required to make the respective gaming machine eligible for a group rotation feature, and make selections of any selectable objects displayed at the respective gaming machine in the course of the group rotation feature. Player interface 301 also allows a player at the gaming machine to initiate plays in a primary game available through the gaming machine in some implementations. The respective video display device 107 associated with each respective gaming machine 100 is used according to the invention to generate the graphic displays to show the various elements of a group rotation feature at the respective gaming machine.

The game control arrangement made up of game server 302 and the respective game client 303 at a given gaming machine functions to control the respective video display device 107 for that gaming machine to display a group rotations graphic and a number of selectable objects. Award controller 305 is responsible for awarding prizes for a player's participation in a group rotation feature, and maintaining progressive prize information where the group rotation feature offers one or more progressive prizes. The network arrangement made up of network switches 306 and 307, and the various communication links 308 shown in FIG. 4A is illustrated merely as an example of a suitable communications arrangement. It should be noted that the game control arrangement, or as it is referred to generally the "game controller," may be implemented in some embodiments entirely on the gaming machine. This is especially true in jurisdictions that allow Class III gaming conducted with random number generators at each gaming machine. The present invention is not limited to any particular communications arrangement for facilitating communications between game server 302 and various gaming machines 100. Any wired or wireless communication arrangement employing any suitable communications protocols (such as TCP/IP for example) may be used in an apparatus according to the invention.

FIG. 4A shows other server(s) 310 included in the network. This illustrated "other server(s)" element 310 may include one or more data processing devices for performing various functions related to games conducted through system 300 and any other games that may be available to players through gaming machines 100. For example, apparatus 300 may be accounting servers providing support for cashless gaming or various forms of mixed cash/cashless gaming through the various gaming machines 100. In this example, an additional one of the other servers 310 will be included in apparatus 300 for supporting these types of wagering and payout systems. As another example, the various gaming machines 100 included in system 300 may allow players to participate in a game (primary game) other than the group rotation feature described herein, and this other game may rely on a result identified at or in cooperation with a device that is remote from the gaming machines. In this example, another server 310 may be included in the system for identifying results for the primary game and communicating those results to the various gaming machines 100 as necessary. Generally, the other server(s) 310 shown in FIG. 4A are shown only to indicate that numerous other components may be included along with the elements that participate in providing group rotation features according to the present invention. Other server(s) 310 may provide record keeping, player tracking, accounting, result identifying services, or any other services that may be useful or necessary in a gaming system.

Referring to FIG. 4B, a block diagram of another example networked gaming system 400 associated with one or more gaming facilities is shown, including one or more networked gaming machines 100 in accordance with one or more embodiments. With reference to FIG. 4B, while a few servers have been shown separately, they may be combined or split into additional servers having additional capabilities.

As shown, networked gaming machines 100 (EGM1-EGM4) and one or more overhead displays 413 may be network connected and enable the content of one or more displays of gaming machines 100 to be mirrored or replayed on an overhead display. For example, the primary display content may be stored by the display controller or game processor 205 and transmitted through network controller 210 to the overhead display controller either substantially simultaneously or at a subsequent time according to either periodic programming executed by game processor 205 or a triggering event, such as a jackpot or large win, at a respective gaming machine 100. In the event that gaming machines 100 have cameras installed, the respective players' video images may be displayed on overhead display 413 along with the content of the player's display 100 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Blackberry® cell phone, Apple® iPhone®, personal data assistant (PDA), iPad®, etc.). To enter the website, a player may log in with a username (that may be associated with the player's account information stored on player account server 409 or be accessible by a casino operator to obtain player data and provide promotional offers), play various games on the website, make various personalizing selections, and save the information, so that during a next gaming session at a casino establishment, the player's playing data and personalized information may be associated with the player's account and accessible at the player's selected gaming machine 100.

Any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method of providing a wagering game on a gaming machine having a display, a wager input device, and at least one electronic controller operatively coupled to the wager input device and the display and configured to execute instructions related to the wagering game, the method comprising:

displaying a matrix of symbol locations on the display, with every symbol location in the matrix having a symbol therein;

receiving a wager from a player at the wager input device, receiving a game activation at the gaming machine, and in response initiating the wagering game;

after initiating the wagering game, updating the matrix of symbols locations to show a new set of symbols;

determining if the updated matrix evaluates to have no winning prizes, then if so, deciding that the updated matrix qualifies for a group rotation feature, and if it qualifies:

(a) determining if the group rotation feature will activate, and if so:

(b) defining a rectangular group of symbols that are a subset of the total symbols in the matrix;

(c) highlighting or visually emphasizing the rectangular group, and rotating the entire group with an accompanying animation on the display showing the rotation;

(d) stopping the rotation with the symbols in different positions in the matrix than before the rotation, excepting a center symbol of the group, if any; and (e) after stopping, evaluating the matrix after the rotation according to paylines defined for the wagering game and awarding any prizes due therefrom.

2. The method of claim 1, wherein the step of determining if the group rotation feature will activate includes making a random determination if the rotation feature will activate as a mystery feature in which no indication is given to the player as to why the random determination's outcome was decided.

3. The method of claim 1, wherein the step of determining if the group rotation feature will activate includes checking for the presence of a specified trigger in the updated matrix.

4. The method of claim 1, wherein the step of rotating the group comprises rotating the entire group 90 degrees to show the symbols stopping oriented horizontally, and further after stopping the rotation showing each individual symbol rotating inside its respective symbol location from a horizontal to vertical orientation.

5. The method of claim 1, further comprising determining whether the rectangular group will be square shaped or oblong shaped, and if it is oblong causing the steps of rotating and stopping the group to stop the group rotated 180 degrees from its original position.

6. The method of claim 1, wherein the step of defining a rectangular group of symbols comprises searching for a group that will cause a prize to be awarded once rotated.

7. The method of claim 6, wherein searching further comprises searching for a group that will cause a prize above a predetermined nonzero threshold amount to be awarded.

8. A method of providing a wagering game on a gaming machine having a display, a wager input device, and at least one electronic controller operatively coupled to the wager input device and the display and configured to execute instructions related to the wagering game, the method comprising:

displaying a matrix of symbol locations on the display, with every symbol location in the matrix having a symbol therein; receiving a wager from a player at the wager input device, receiving a game activation at the gaming machine, and in response initiating a base game round including updating the matrix of symbols locations to show a new set of symbols;

making a first symbol group rotation feature available in the base game round, to rotate a first defined rectangular group of symbols to a new position in the matrix, the first symbol group rotation feature including searching for a group that will cause a prize above a first predetermined nonzero threshold to be awarded once rotated; and making a free spin bonus round available to be triggered in the base game round, the free spin bonus round including multiple free spins, and making a second symbol group rotation feature available to be activated in the each free spin, the second symbol group rotation feature operable to rotate a second rectangular group of symbols to a new position in the matrix, the second symbol group rotation feature including searching for a group that will cause a prize above a second predetermined nonzero threshold to be awarded once rotated, the second determined threshold being lower than the first determined threshold.

9. The method of claim 8, wherein making the first symbol group rotation feature available further comprises making a random determination if the rotation feature will activate as a mystery feature in which no indication is given to the player as to why the random determination's outcome was decided.

10. The method of claim 9, wherein the making a first symbol group rotation feature available to be activated further comprises not activating the first symbol group rotation feature in any base game round in which a free spin bonus round is triggered.

11. The method of claim 8, wherein the step of making a first symbol group rotation feature available in the base game round includes checking for the presence of a specified trigger in the updated matrix to determine if the first symbol group rotation feature will activate.

12. The method of claim 8, wherein the step of rotating the first rectangular group comprises rotating the entire group 90 degrees to show the symbols stopping oriented horizontally in the different positions, and further after stopping the rotation showing each individual symbol rotating inside its respective symbol location from a horizontal to vertical orientation.

13. The method of claim 8, further comprising determining whether the first rectangular group will be square shaped or oblong shaped, and if it is oblong causing the steps of rotating and stopping the group to stop the group rotated 180 degrees from its original position.

14. A system for providing a wagering game for a player, the system comprising an electronic gaming machine interacting with at least one server, a display, a wager input device, and at least one electronic controller operatively coupled to the wager input device and the display and configured to execute instructions related to the wagering game, the system programmed for:

displaying a matrix of symbol locations on the display, with every symbol location in the matrix having a symbol therein;

receiving a wager from a player at the wager input device, receiving a game activation at the gaming machine, and in response initiating the wagering game;

after initiating the wagering game, updating the matrix of symbols locations to show a new set of symbols;

determining if the updated matrix qualifies for a group rotation feature, and if it qualifies:

(a) determining if the group rotation feature will activate, and if so:

(b) defining a rectangular group of symbols that are a subset of the total symbols in the matrix;

(c) highlighting or visually emphasizing the rectangular group, and rotating the entire group with an accompanying animation on the display showing the rotation;

(d) stopping the rotation with the symbols in different positions in the matrix than before the rotation, excepting a center symbol of the group, if any; and (e) after stopping, evaluating the matrix after the rotation according to paylines defined for the wagering game and awarding any prizes due therefrom.

15. The system of claim 14, further programmed for, when determining if the group rotation feature will activate, making a random determination if the rotation feature will activate as a mystery feature in which no indication is given to the player as to why the random determination's outcome was decided.

16. The system of claim 14, further programmed for, when determining if the group rotation feature will activate, checking for the presence of a specified trigger in the updated matrix.

17. The system of claim 14, further programmed for, when defining a rectangular group of symbols, searching for a group that will cause a prize above a predetermined nonzero threshold amount to be awarded.

18. The system of claim 17, further programmed for making the group rotation feature available in both a base game round and a free spin bonus game round, and programmed for, when activated in the free spin bonus round, searching for a group that will cause a prize above a predetermined nonzero threshold uses a lower threshold than the predetermined nonzero threshold used in the base game round.

* * * * *